(12) United States Patent
Shahin

(10) Patent No.: US 12,422,006 B2
(45) Date of Patent: Sep. 23, 2025

(54) BRAKE PAD ASSEMBLY FOR A DISK BRAKE SYSTEM AND DISK BRAKE SYSTEM

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 412 days.

(21) Appl. No.: 18/111,262

(22) Filed: Feb. 17, 2023

(65) Prior Publication Data
US 2023/0265899 A1    Aug. 24, 2023

(30) Foreign Application Priority Data
Feb. 22, 2022    (DE) .......................... 102022201860.5

(51) Int. Cl.
*F16D 65/097* (2006.01)
*F16D 55/225* (2006.01)
(Continued)

(52) U.S. Cl.
CPC ......... *F16D 65/097* (2013.01); *F16D 55/225* (2013.01); *F16D 65/0006* (2013.01); *F16D 65/092* (2013.01); *F16D 65/0971* (2013.01); *F16D 2200/0021* (2013.01); *F16D 2200/0056* (2013.01); *F16D 2250/0069* (2013.01)

(58) Field of Classification Search
CPC .. F16D 65/097; F16D 65/0006; F16D 65/092; F16D 65/0971; F16D 65/095; F16D 55/225; F16D 69/027; F16D 2200/0021; F16D 2200/0056; F16D 2250/0069
See application file for complete search history.

(56) References Cited

U.S. PATENT DOCUMENTS

| 4,603,760 A | 8/1986 | Myers |
| 2009/0000893 A1 | 1/2009 | Denys |

(Continued)

FOREIGN PATENT DOCUMENTS

| DE | 19756553 A1 | 7/1999 |
| JP | S-57120741 A | 7/1982 |

(Continued)

OTHER PUBLICATIONS

Office Action issued in corresponding German Patent Application No. 10 2022 201 860.5 dated Nov. 16, 2022.

*Primary Examiner* — Timothy Hannon
(74) *Attorney, Agent, or Firm* — LEE, HONG, DEGERMAN, KANG & WAIMEY

(57) ABSTRACT

The application relates to a brake pad assembly for a disk brake system. In addition, the application relates to a disk brake system. The proposed brake pad assembly comprises a back plate having a front side for facing a brake disk of the disk brake system and a back side. A friction layer is arranged at the front side of the back plate for contacting a friction surface the brake disk. Further, a shim is arranged on the back side of the back plate. The shim has a front side facing the back plate. Further, an adhesive layer is arranged between the back side of the back plate and the front side of the shim. The shim further comprises a metal layer having a wave-shaped surface on its front side.

12 Claims, 14 Drawing Sheets

(51) Int. Cl.
    *F16D 65/00*   (2006.01)
    *F16D 65/092*  (2006.01)

(56) References Cited

U.S. PATENT DOCUMENTS

| | | | | |
|---|---|---|---|---|
| 2015/0292583 | A1* | 10/2015 | Inokuchi | ............... F16D 69/04 |
| | | | | 188/250 G |
| 2017/0152904 | A1* | 6/2017 | Lee | ................... F16D 65/0006 |
| 2020/0011389 | A1* | 1/2020 | Koizumi | ................ B29B 7/90 |
| 2020/0309208 | A1 | 10/2020 | Andersson et al. | |

FOREIGN PATENT DOCUMENTS

| | | | |
|---|---|---|---|
| JP | 2014-134232 | A | 7/2014 |
| JP | 2018-123866 | A | 8/2018 |

\* cited by examiner

BRAKE PAD ASSEMBLY FOR A DISK BRAKE SYSTEM AND DISK BRAKE SYSTEM

CROSS-REFERENCE TO RELATED APPLICATION

This application is based on and claims priority under 35 U.S.C. § 119 to German Patent Application No. 102022201860.5, filed on Feb. 22, 2022 in the German Patent and Trade Mark Office, the disclosures of which are incorporated herein by reference.

TECHNICAL FIELD

The application relates to a brake pad assembly for a disk brake system. In addition, the application relates to a disk brake system.

BACKGROUND

Brake Engineers are in search for robust solutions to suppress squeal noises (tonal loud noises typically appearing in frequencies between 1000 and 16000 Hz) in disk brake systems. Different solutions are known to improve the noise, vibration, and harshness (NVH) characteristics, including a steel shim glued to a back side of a back plate of a brake pad assembly, different chamfers on a pad of the brake pad assembly, slots on pad surfaces contacting the disk, modifications of friction material of the brake pads, and an underlayer connecting the friction material to the back plate. While these solutions can help improve the squeal noise characteristics, in most cases these solutions work well only under specific braking conditions (low or high frequency, cold or warm temperature). Prior art can be found, e.g., in document DE 197 06 122 A1.

SUMMARY

In view of the above-mentioned aspects, it is an object of the present invention to provide an improved brake pad assembly for a disk brake system. In particular, it is an object of the application to provide a compact and robust brake pad assembly, which reliably suppresses squeal noises over a wide range of braking conditions. In addition, it is an object of the application to provide an improved disk brake system having these advantages.

This objective is achieved by a brake pad assembly for a disk brake system comprising the features of claim 1 and by a disk brake system having the features of another claim. Optional further features and further developments will become apparent from the dependent claims and the detailed description in conjunction with the accompanying figures.

The proposed brake pad assembly for a disk brake system comprises a back plate having a front side for facing a brake disk of the disk brake system and a back side. A friction layer is arranged at the front side of the back plate for contacting a friction surface the brake disk. Further, a shim is arranged on the back side of the back plate. The shim has a front side facing the back plate. Further, an adhesive layer is arranged between the back side of the back plate and the front side of the shim. In most embodiments, the shim is fixed to the back plate by adhesive bonding provided by the adhesive layer. The shim further comprises a metal layer having a wave-shaped surface on its front side.

The wave-shaped surface of the metal layer of the shim leads to an improved squeal noise reduction of the shim. It has been found that the structural damping properties of the brake pad are improved due to the wave-shaped surface of the shim. In this way, the shim achieves an improved reduction of sound pressure level in a wide range of frequencies. The present application further relates to a disk brake system having the brake pad assembly as described above or below.

Besides the improved structural damping effect of the shim due to the wave-shaped surface of its metal layer, the wave-shaped surface of the metal layer of the shim leads to improved friction damping characteristics. In particular, the wave-shaped surface may yield an improved behavior in dynamic situations and may improve dissipation of energy (both kinetic and deformation energy). For improved friction damping characteristics, the metal layer of the shim may be configured to be deformed in a normal direction upon brake application due to the wave-shaped surface the metal layer of the shim.

In some embodiments, the metal layer of the shim is configured to be deformed in a direction perpendicular to a longitudinal direction of wave crests of the wave-shaped surface upon brake application due to the wave-shaped surface the metal layer of the shim. In this manner, the dynamic behavior and the friction damping characteristics of the brake pad assembly may be further improved. For example, the disk brake system may comprise a brake piston and/or a caliper finger. Further, the wave-shaped surface may be shaped such that the metal layer of the shim deforms under pressure of the brake piston or caliper finger, e.g., upon application of the brake.

The longitudinal direction of the wave crests may have a radial component or may be a radial direction of the brake pad assembly. The radial direction typically corresponds to a radial direction of the brake disk. The metal layer of the shim may be configured to be deformed in more than one direction. In particular, a deformation of the metal layer of the shim may have components in a radial direction of the brake pad assembly. Due to the deformation that is enabled or increased by the feature of the wave-shaped surface, the effect of friction damping provided by the shim may be improved to further improve the noise characteristics of the brake pad assembly.

Particularly in embodiments in which the longitudinal direction of the crests and troughs of the wave-shaped surface extends in a direction having a radial component, the metal layer of the shim may be configured to be deformed in a tangential direction. The tangential direction typically corresponds to a tangential direction of the brake disk. In particular, the wave-shaped surface of the metal layer of the shim may be shaped such that it improves a deformation of the metal layer of the shim in a tangential direction. In preferred embodiments, the wave-shaped surface of the metal layer of the shim may be shaped such that it improves a deformation of the metal layer of the shim in a tangential and in a radial direction. In some embodiments, the crests and troughs of the wave-shaped surface may extend in a direction having a radial component and/or a tangential component. Preferably, the crests and troughs of the wave-shaped surface may extend in a direction having a radial component and a tangential component, for example, at least in parts of the wave-shaped surface of the metal layer of the shim. In this manner, the effect of friction damping can be further improved and the noise reduction of the shim may be improved. For example, under pressure of the piston or caliper finger, i.e., upon braking, the shim may deform in a normal and in a tangential direction as well as in a radial direction and thereby an additional structural damping effect may be achieved, so that a dynamic behavior of the disk brake system is improved.

For further improvement of the damping properties of the shim, the wave-shaped surface of the metal layer of the shim may have a sinusoidal surface profile. For example, the surface profile may be a profile in a direction perpendicular to a direction of longitudinal extension of the wave crests and/or the wave troughs.

In some embodiments, an amplitude of the wave-shaped surface of the metal layer of the shim is at least 0.1 mm, preferably at least 0.3 mm, and/or at most 1 mm, preferably at most 0.5 mm, for further improvement of the damping properties. The amplitude may be measured as a different in height between a wave crest and an adjacent wave trough. In addition, a wavelength of the wave-shaped surface of the metal layer of the shim may be at least 5 mm, preferably at least 15 mm, and/or at most 50 mm, preferably at most 25 mm. In this way, particularly favorable damping properties of the shim can be achieved. The wavelength is typically measured between neighboring wave crests. Typically, the wavelength is measured in a direction orthogonal to the direction of longitudinal direction extension of the wave crests and/or wave troughs. In typical embodiments, the wave-shaped surface of the metal layer of the shim comprises at least four, in particular at least 10, wave crests and/or wave troughs. A thickness of the metal layer is typically at least 0.1 mm, preferably at least 0.3 mm, and/or at most 1 mm, preferably at most 0.6 mm.

According to some embodiments that have particularly good noise damping properties, the metal layer of the shim is a steel layer. In some embodiments, the front side of the metal layer is in its entirety formed by the wave shaped surface to achieve further improved noise damping characteristics.

In particular embodiments, the wave-shaped surface of the shim may improve a material damping contribution, because the damping properties that the adhesive layer provides may be improved. The wave-shaped surface of the metal layer may in some embodiments form the front side of the shim. Typically, the adhesive layer comprises an adhesive. The adhesive may provide an adhesive bonding effect that fixes the shim to the back plate. Further, the wave-shaped surface of the metal layer of the shim may comprise wave troughs. The adhesive may at least partly fill the wave troughs. In this way, a surface area of the shim may be increased for an improved adhesion and further improved material damping properties. In particular, the adhesive may completely fill the wave troughs in some embodiments. For example, there may essentially be no air gap between the back plate and the shim. In some embodiments, a back side of back plate is formed by a flat surface.

The metal layer of the shim may in some embodiments have a non-uniform thickness. For example, the metal layer of the shim may have a flat surface on a back side of the metal layer of the shim. In this manner, a compact arrangement with a more homogeneous pressure distribution upon brake application may be achieved.

In some embodiments, the shim has a flat surface on its back side to enable a flat contact with the brake piston or caliper finger. In this way, the pressure distribution can be further improved.

In preferred embodiments, the shim comprises a rubber layer. The rubber layer may further improve the damping properties of the shim. The rubber layer may, in some embodiments, at least in part be arranged on a back side of the metal layer. The rubber layer may have a flat back surface for improved contact with the brake piston or caliper finger. The back side of the shim may be formed by the rubber layer. The rubber layer may have a front side that is formed by a flat surface.

In some embodiments, the metal layer of the shim is embedded within the rubber layer. In this way, the damping properties of the shim can be further improved. For example, the rubber layer may be in direct contact with the front side of the metal layer of the shim as well as with the back side of the metal layer of the shim. For ease of production and beneficial noise damping properties in such embodiments, the metal layer of the shim may have a uniform thickness. For example, the metal layer of the shim may have also have a wave-shaped surface on its back side.

BRIEF DESCRIPTION OF DRAWINGS

Exemplary embodiments will be described in conjunction with the following figures.

DETAILED DESCRIPTION

Figure 1:
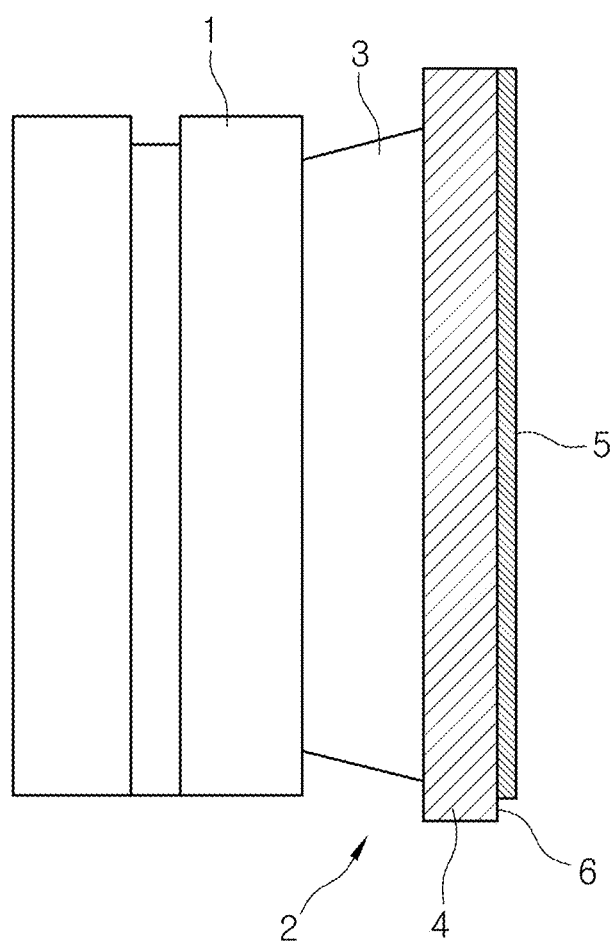
FIG. 1 shows a schematic cross sectional illustration of a brake pad assembly and a brake disk.

FIG. 1 shows a brake disk 1 of a of a disk brake system for a vehicle. The disk brake system may comprise a caliper housing, a caliper finger and a brake piston (not shown). The disk brake system further comprises a brake pad assembly 2, which may be attached to or arranged adjacent to the caliper finger and/or to the piston. The brake pad assembly 2 has a friction layer 3, which is pushed against a friction surface of the brake disk 1 upon hydraulic or electric actuation of the disk brake system. The friction layer 3 contains a material that shows a good stopping performance and heat transfer when engaging with the brake disk 1. The friction layer 3 is attached to a front side of a back plate 4, which provides structural stability to the brake pad assembly 2. In most embodiments, the back plate 4 is made of a metal, in particular steel. A thickness of the back plate 4 may be at least 3 mm and/or at most 8 mm. The friction layer 3 can have a thickness of at least 8 mm and/or at most 15 mm, for example. The material of the friction layer 3 can for instance comprise at least one of copper, iron sulphide, graphite, zinc powder, basalt, calcium carbonate, tin sulphide, zinc aluminium, phenolic resin, rubber dust and mineral fiber. These materials show good stopping performance and heat transfer when engaging with the brake disk 1.

Figure 2:
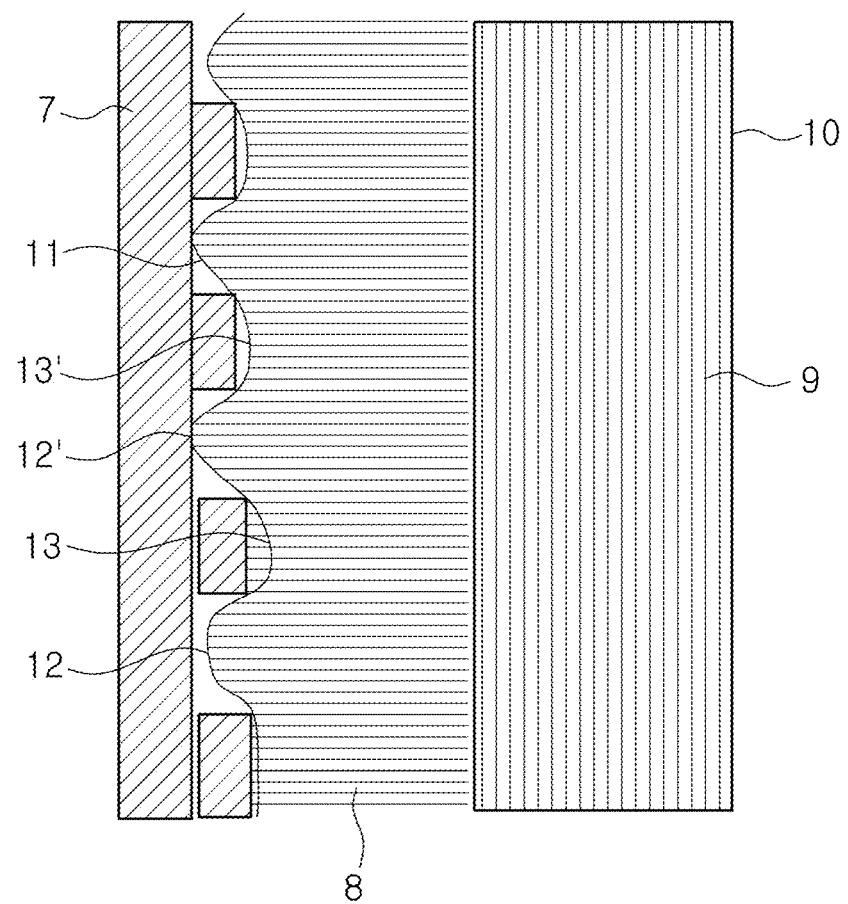
FIG. 2 shows a more detailed view of an adhesive layer and a shim according to an embodiment of the brake pad assembly.
Figure 3:
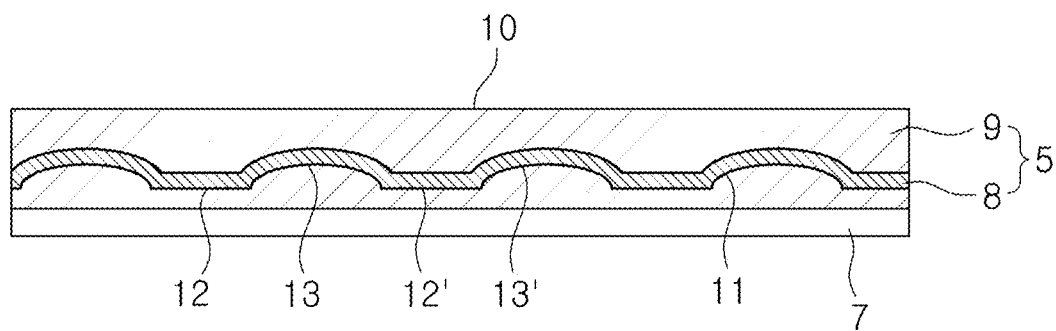
FIGS. 3 to 10 show further embodiments of the brake pad assembly.
Figure 4:
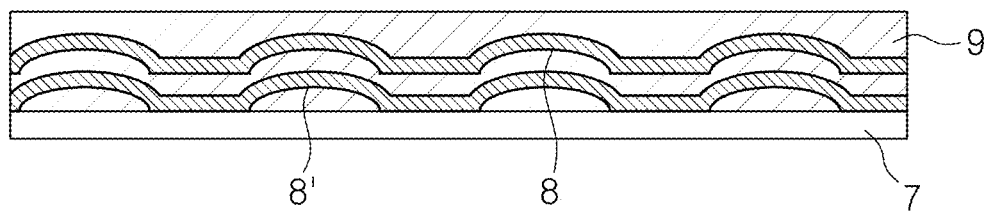
Figure 5:
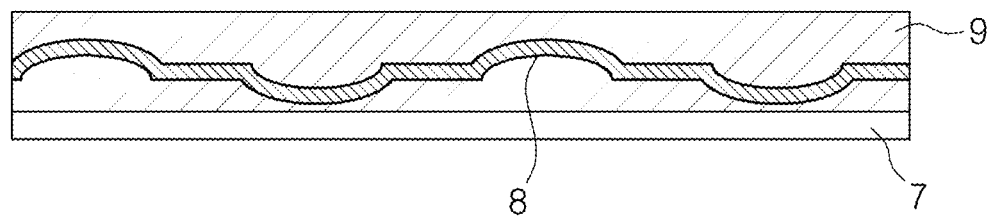
Figure 6:
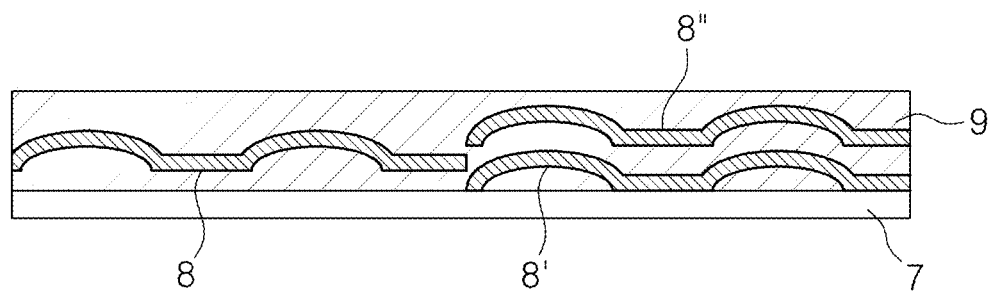
Figure 7:
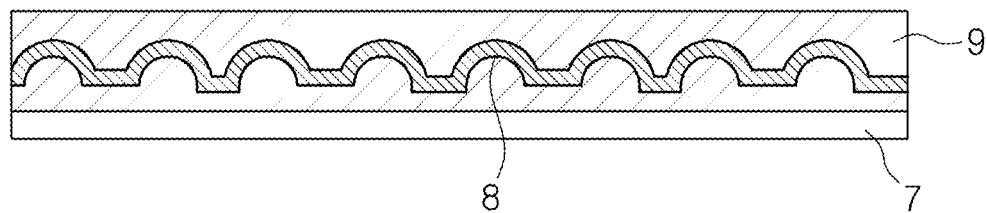
Figure 8:
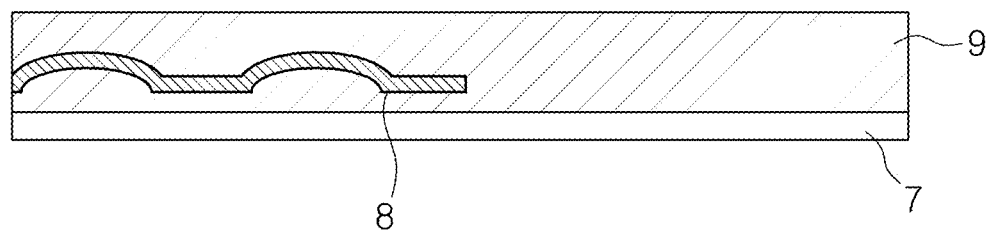
Figure 9:
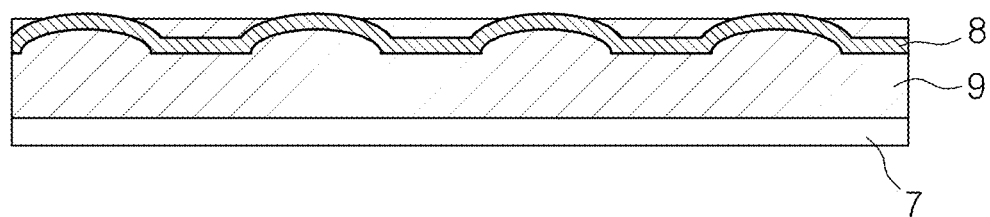
Figure 10:
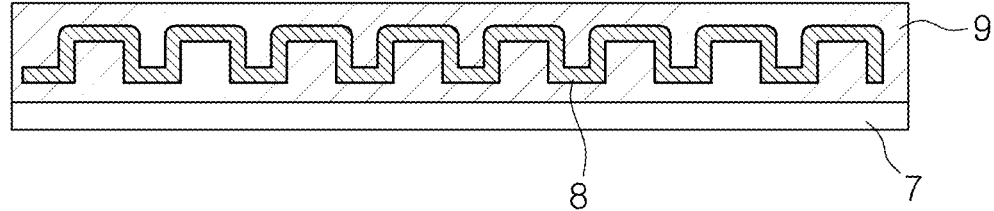

A shim 5 is mounted to a back side 6 of the back plate 4. The shim 5 is glued to the back side 6 of the back plate 4 using an adhesive layer 7. FIG. 2 shows the adhesive layer 7 and the shim 5 in more detail. Corresponding and reoccurring features shown in the different figures are denoted using the same reference numerals. The shim 5 comprises a layered structure having a metal layer 8, which is typically made of steel. The shim 5 according to the embodiment shown further comprises a rubber layer 9. The rubber layer 9 covers a back side of the metal layer 8. In the embodiment, the metal layer 8 has a back side that is formed by a flat surface. In addition, a back side 10 of the rubber layer 9, which is formed by a flat surface, forms a back side 10 of the shim 5. Upon application of the brake, the piston or the caliper finger of the disk brake system pushes against the back side 10 of the rubber layer 9 of the shim 5 to press the brake pad assembly 2 against the friction surface of the brake disk 1. A total thickness of the shim 5, including the rubber layer 9, if provided, may, e.g., amounts to at least 0.2 mm and/or at most 2 mm.

A front side of the shim 5 is, in the embodiment shown, formed by a front side 11 of the metal layer 8. As shown in FIG. 2, the front side 11 of the metal layer 8 is formed by a wave-shaped surface. The wave-shaped surface of the front side 11 of the metal layer 8 is sinusoidal and has wave crests 12, 12' separated by wave troughs 13, 13'. In most embodiments, the wave troughs 13, 13' of the wave-shaped surface on the front side 11 of the metal layer 8 are completely filled by a material, in particular by a non-metallic material. In the embodiment of FIG. 2, the wave troughs 13, 13' are completely filled by the adhesive layer 7 that connects the metal layer 8 if the shim 5 with the back side 6 of the back plate 4.

FIGS. 3 to 10 show other embodiments of the brake pad assembly. These embodiments correspond in essence to the embodiment described above. However, according to the embodiments of FIGS. 3 to 10, the wave troughs 13, 13' formed by the wave-shaped surface on the front side 11 of the metal layer 8 are not filled by the adhesive layer 7, but by parts of the rubber layer 9. According to these embodiments, the metal layer 8 has a uniform thickness and is embedded within the rubber layer 9. As described with regard to the other embodiment above, the rubber layer 9 has front and back sides that are formed by flat surfaces, and the back side 10 of the rubber layer 9 forms the back side 10 of the shim 5. The adhesive layer 7 attaches the shim 5 to the back side 6 of the back plate 4. FIGS. 3 to 10 illustrate that different arrangements are possible, including differently shaped metal layers 8 having wave-shaped surfaces and a shim 5 having multiple metal layers 8, 8', 8" embedded in the rubber layer 9.

Figure 11:
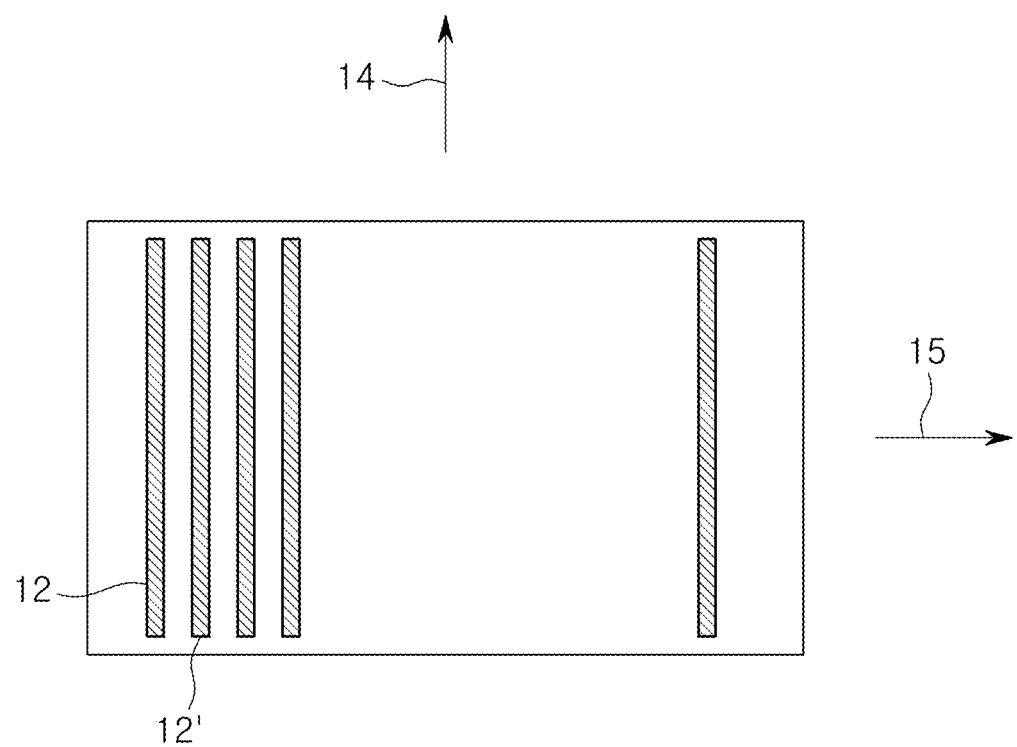
FIGS. 11 to 14 show top views of a front surface of a metal layer of the shim.
Figure 12:
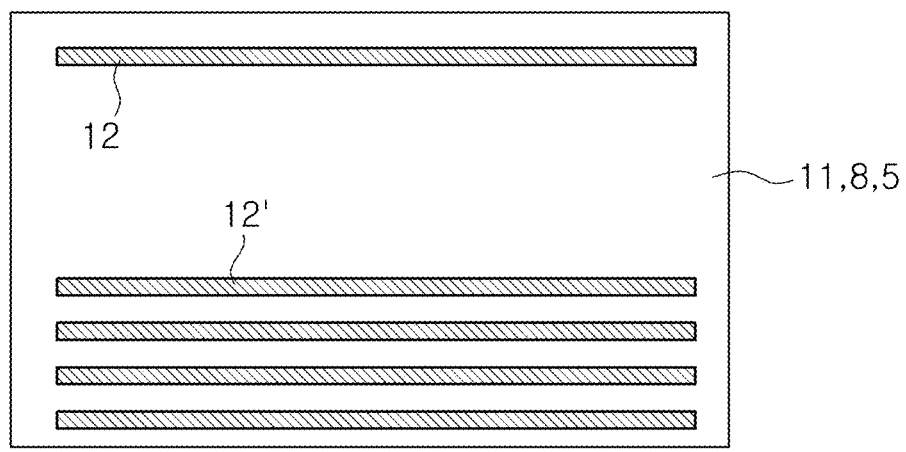
Figure 13:
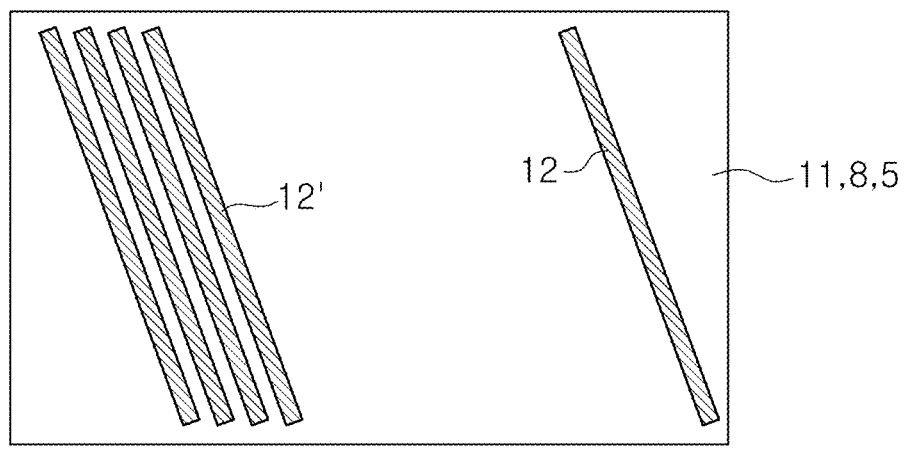
Figure 14:
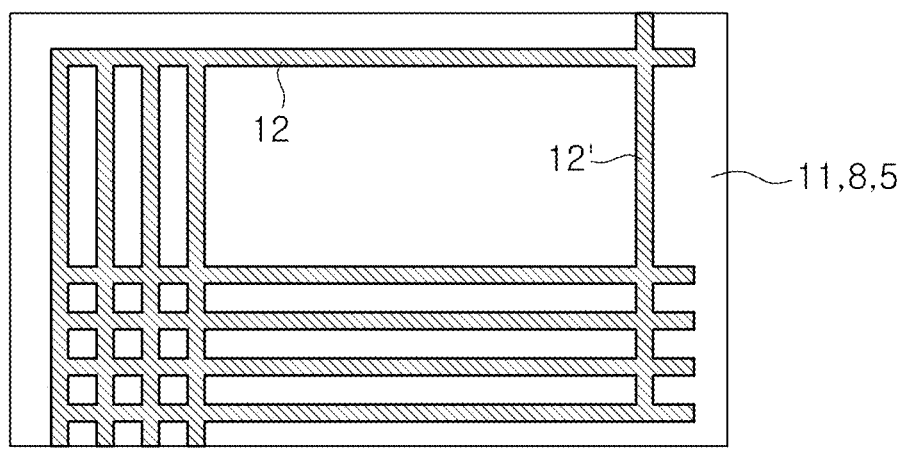

FIGS. 11 to 14 show schematic views of the metal layer 8 as viewed from its front side 11. The wave-shaped surface can be formed by different patterns of wave crests 12, 12'. As shown in FIG. 11, the wave crests 12, 12' can extend in a radial direction 14 (as defined with respect to disk shape of the brake disk 1). Alternatively, as shown in FIG. 12, the wave crests 12, 12' can extend in a tangential direction 15. It is, however, preferred that the wave crests 12, 12' extend in a direction having a radial component as well as a tangential component, as illustrated in FIG. 13. In this manner, the wave-shaped surface of the metal layer 8 improves not only a normal deformation the shim 5, but also a deformation in the radial as well as in the tangential direction upon application of the brake, e.g., when the brake piston or the caliper finger pushes onto the back side of the shim 5. In this way, squeal noises can be further sup-pressed. As FIG. 14 shows, in some embodiments, the wave-shaped surface may be formed by wave crests 12, 12' that extend in different directions, e.g., in the radial direction 14 and in the tangential direction 15, respectively.

Features of the different embodiments which are merely disclosed in the exemplary embodiments may be combined with one another and may also be claimed individually.

What is claimed is:

1. A brake pad assembly for a disk brake system, comprising a back plate having a front side for facing a brake disk of the disk brake system and a back side, a friction layer arranged at the front side of the back plate for contacting a friction surface the brake disk, a shim arranged on the back side of the back plate, wherein the shim has a front side facing the back plate, and an adhesive layer arranged between the back side of the back plate and the front side of the shim, characterized in that the shim comprises a metal layer having a wave-shaped surface on its front side, the shim comprises a rubber layer, and the metal layer of the shim is embedded within the rubber layer.

2. The brake pad assembly of claim 1, characterized in that the metal layer of the shim is configured to be deformed in a normal direction upon brake application due to the wave-shaped surface the metal layer of the shim.

3. The brake pad assembly of claim 1, characterized in that the metal layer of the shim is configured to be deformed in a direction perpendicular to a longitudinal direction of wave crests of the wave-shaped surface upon brake application due to the wave-shaped surface the metal layer of the shim.

4. The brake pad assembly of claim 1, characterized in that an amplitude of the wave-shaped surface of the metal layer of the shim is at least 0.1 mm and at most 1 mm.

5. The brake pad assembly of claim 1, characterized in that a wavelength of the wave-shaped surface of the metal layer of the shim is at least 5 mm and at most 50 mm.

6. The brake pad assembly of claim 1, characterized in that the metal layer of the shim is a steel layer.

7. The brake pad assembly of claim 1, characterized in that the shim has a flat surface on its back side.

8. The brake pad assembly of claim 1, characterized in that the wave-shaped surface of the metal layer of the shim has a sinusoidal surface profile.

9. The brake pad assembly of claim 1, characterized in that the adhesive layer comprises an adhesive and the wave-shaped surface of the metal layer of the shim comprises wave troughs, wherein the adhesive at least partly fills the wave troughs.

10. The brake pad assembly of claim 1, characterized in that the metal layer of the shim has a non-uniform thickness.

11. A disk brake system comprising a brake piston or a caliper finger and the brake pad assembly of claim 1, wherein the wave-shaped surface is shaped such that the metal layer of the shim deforms under pressure of the brake piston or caliper finger.

12. The disk brake system of claim 11, characterized in that the wave-shaped surface of the metal layer of the shim is shaped such that it improves a deformation of the metal layer of the shim in a tangential direction and in a radial direction.

* * * * *